United States Patent
Kamel et al.

(10) Patent No.: US 6,374,103 B1
(45) Date of Patent: Apr. 16, 2002

(54) METHOD AND SYSTEM FOR OVERHEAD MESSAGE UPDATES

(75) Inventors: Raafat Edward Kamel, Westfield; Martin Howard Meyers, Montclair; Charles Albert Sanders, Morristown; Carl Francis Weaver, Morris Plains, all of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/164,399

(22) Filed: Sep. 30, 1998

(51) Int. Cl.$^7$ ................................................. H04Q 7/08
(52) U.S. Cl. ..................... 455/426; 455/434; 455/445; 455/455; 455/458; 455/464; 455/550
(58) Field of Search ................................ 455/458, 414, 455/422, 432, 434, 435, 515, 550, 464, 567, 38.3, 445, 455; 370/320, 321, 335, 342, 349, 337, 528, 336

(56) References Cited

U.S. PATENT DOCUMENTS

| | | | |
|---|---|---|---|
| 4,527,284 A | | 7/1985 | Röttger |
| 5,267,261 A | * | 11/1993 | Blakeney, II et al. ............ 375/1 |
| 5,511,067 A | * | 4/1996 | Miller ........................ 370/335 |
| 5,566,357 A | | 10/1996 | Holoman |
| 5,603,081 A | * | 2/1997 | Raith et al. ................. 455/435 |
| 5,640,414 A | * | 6/1997 | Blakeney, II et al. ....... 375/200 |
| 5,729,540 A | * | 3/1998 | Wegrzyn .................... 370/336 |
| 5,778,316 A | * | 7/1998 | Persson et al. ............. 455/434 |
| 5,923,649 A | * | 7/1999 | Raith ......................... 370/328 |
| 5,924,026 A | * | 7/1999 | Krishnan .................... 455/414 |
| 5,930,706 A | * | 7/1999 | Raith ......................... 455/422 |
| 6,018,661 A | * | 1/2000 | Raith et al. ................. 455/437 |
| 6,029,065 A | * | 2/2000 | Shah ........................... 455/414 |
| 6,101,173 A | * | 8/2000 | Bayley ....................... 370/311 |

FOREIGN PATENT DOCUMENTS

| | | |
|---|---|---|
| EP | 0415502 | 3/1991 |
| EP | 0930798 | 7/1999 |
| WO | 9610895 | 4/1996 |

OTHER PUBLICATIONS

Varma, V K et al., "Integrated Alerting and System Broadcast Channel for a Wireless Access System," Feb. 1, 1996, vol. 45.

* cited by examiner

Primary Examiner—Daniel Hunter
Assistant Examiner—Yemane Woldetatios
(74) Attorney, Agent, or Firm—Gibbons, Del Deo, Dolan, Griffinger & Vecchione

(57) ABSTRACT

A method and apparatus for arranging transmission of overhead messages on the paging channel of a wireless communications system is described. Certain paging channel slots are established, based on a timing reference, that must contain an overhead message. In the intervening slots or slot fragments, the base station transmits mobile-directed messages, when they are available. When no mobile directed messages are available for transmission, the base station selects an overhead message from a queue for transmission on the intervening paging channel slot or slot fragment.

18 Claims, 3 Drawing Sheets

METHOD AND SYSTEM FOR OVERHEAD MESSAGE UPDATES

FIELD OF THE INVENTION

This invention relates to the field of wireless communications and more particularly to the field of overhead messaging in code division multiple access systems.

BACKGROUND OF THE INVENTION

A code division multiple access (CDMA) cellular telephone system uses spread spectrum technology to allow multiple users access to the same frequency band. The Telecommunication Industry Association and the Electronics Industry Association have adopted a standard, TIA/EIA IS-95 (IS-95), for digital cellular phone applications using CDMA techniques. Such IS-95 systems are disclosed in detail in Garg, Smolik and Wilkes, Applications of CDMA In Wireless/Personal Communications, Prentice Hall, 1997.

A CDMA system uses pseudorandom noise (PN) sequences to spread base station and mobile signals to the transmission bandwidth. Transmitted signals using different PN sequences can be received at the receiver, and the PN sequences allow the receiver to distinguish a desired signal from all the received signals.

The geographic coverage provided by a CDMA cellular telephone system is divided into coverage cells, where each cell corresponds to a base station. The cell may be further divided for certain types of base stations into multiple sectors, where each sector uses multiple carrier channels.

In an IS-95 system, the parameters a mobile uses to establish and maintain a call are transmitted as a set of over the air (OTA) messages, known as overhead messages, by every base station in the network. In a mobile originated call, the mobile determines if it has a current set of overhead messages before requesting traffic channel resources.

If the overhead messages are not up to date, the mobile monitors the paging channel to update the overhead messages. Once the mobile updates its overhead messages, it begins the access procedure. The likelihood of success of an origination attempt is related to the time taken to complete overhead message updates. The longer the process takes, the more likely the mobile is to leave the cell's coverage area, causing an access failure.

SUMMARY OF THE INVENTION

This invention provides a method for reducing the time for a mobile to update overhead messages prior to making an access attempt, thereby improving the call origination success rate. The method takes advantage of time slots on the paging channel which are typically filled with a null message. According to this invention, a base station transmits a selected overhead message, in lieu of a null message. Because overhead messages are thereby transmitted more frequently, the mobile cycles through required messages and updates its parameters in a reduced time.

In one embodiment, the base station runs a timer to determine the paging channel slots that must contain an overhead message. In the intervening slots or slot fragments, the base station transmits mobile-directed messages, when they are available. When no mobile directed messages are available for transmission and the timer has not signaled that an overhead message must be sent, the base station selects an overhead message from a queue for transmission on the paging channel slot or slot fragment.

The actual selection algorithm for the overhead message is not critical, although the various overhead messages should be selected with approximately the same frequency. A base station operating according to the method of the invention sends overhead message updates more frequently without consuming additional paging channel capacity, since the existing paging channel resources are used more efficiently.

BRIEF DESCRIPTION OF THE DRAWINGS

A more complete understanding of the present invention may be obtained from consideration of the following description in conjunction with the drawings in which.

DETAILED DESCRIPTION

This description discusses method and apparatus for increasing the frequency of transmission of overhead message updates in a CDMA cellular telephone system. In an IS-95 system, call processing for a mobile initiated call is divided into four states. During the mobile initialization state, the mobile seeks a suitable CDMA system (i.e. a serving base station), acquires a pilot channel, and obtains system configuration and timing information. Once the mobile completes this initialization, it enters an idle state where it begins monitoring the paging channel.

In an IS-95 system, a mobile only monitors a paging channel associated with one base station and soft hand-offs are not applicable while the mobile is in the idle state. The mobile, if it leaves a base station service area, may, however, execute idle handoffs, whereby it monitors a paging channel associated with a base station in the new service area. While monitoring the paging channel, the mobile receives overhead messages, including system parameter and access parameter messages. Before the mobile will attempt to access a base station, it monitors the paging channel until the access parameters have been updated. Additional call processing details can be found in Garg, Smolik and Wilkes, Applications of CDMA In Wireless/Personal Communications, Prentice Hall, 1997, p. 34 to p. 59.

Figure 1:
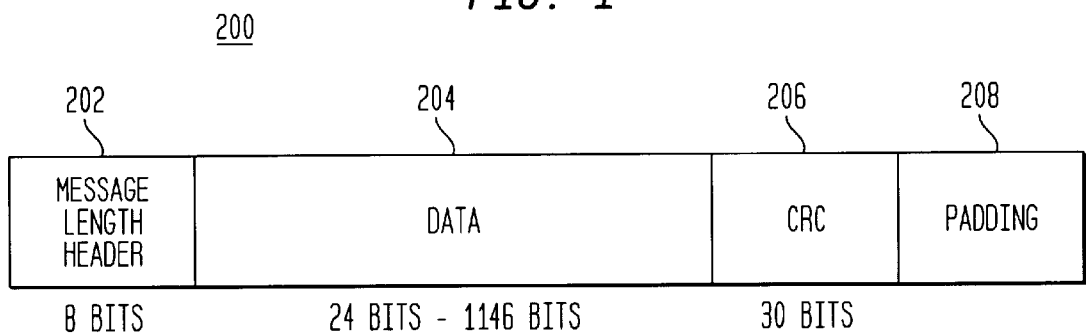
FIG. 1 is an exemplary paging channel frame.
Figure 2:
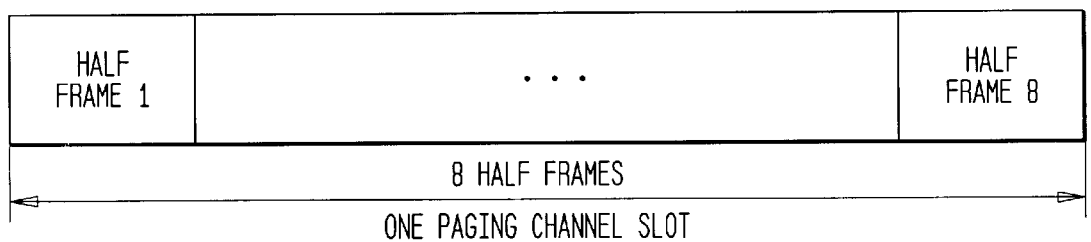
FIG. 2 is an exemplary paging channel slot.

Referring to FIG. 1, the CDMA message frame of the forward paging channel is illustrated. A paging channel message 200 has an 8 bit message length header 202, a message body 204, which is 2 bits to 1146 bits long, and a cyclic redundancy check 206 code of 30 bits. The padding 208 is not part of the paging channel message. When a paging channel message is formed, it is typically sent in a paging channel half-frame, consisting of a synchronization bit and a chunk of data. Eight paging channel half-frames combine to form a paging channel slot 300, as shown in FIG., 2. An entire paging channel message is sent in N slots, and there are a finite number of slots a message can use.

The paging channel carries a variety of messages, including system parameter messages, access parameter messages, order messages, channel assignment messages and the null message. All mobiles in an area receive the system parameter messages, which specify the characteristics of the serving system. Similarly, all mobiles receive the access parameters, which specify the parameters the mobile is to use when originating a call. Other overhead messages in an IS-95 system include neighbor list messages, CDMA access channel list messages, channel assignment messages, extended system parameter messages and global service redirection messages.

On the other hand, mobile directed messages, such as order messages, are directed to a particular mobile and may direct an operation or confirm a request. A null paging message fills out unused slots and informs the mobile that no useful data is contained in the remainder of the slot. For an additional discussion of the paging channel and its message set, refer to Garg, Smolik and Wilkes, Applications of CDMA In Wireless/Personal Communications, Prentice Hall, 1997, p. 124–127.

In a preferred embodiment of this invention, the base station fills unused paging channel slots with overhead messages required for base station access, such as access parameter messages. In lieu of transmitting null messages, the base station selects an overhead message to fill available (otherwise unused) slots or slot fragments, resulting in near continuous transmission of overhead messages during periods of low traffic activity.

Figure 3:
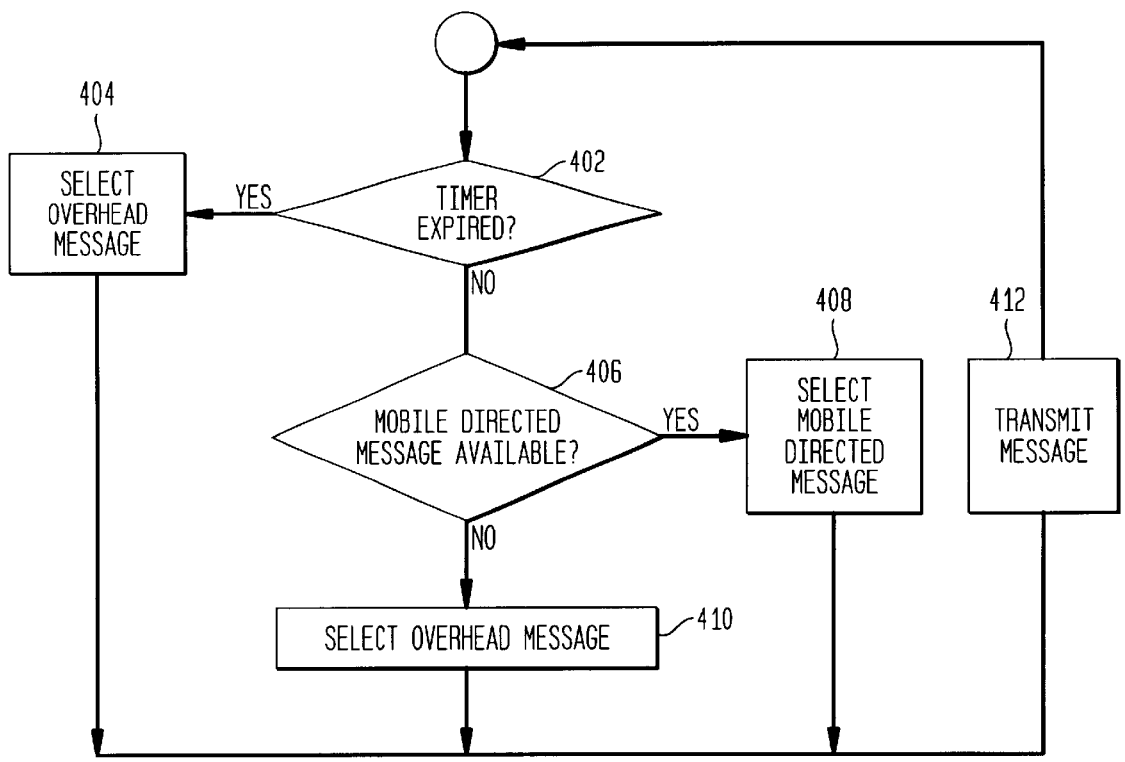
FIG. 3 is an exemplary flow diagram according to this invention.

FIG. 3 illustrates in a flow chart, the steps performed by a base station 400 to implement this method. A first decision step 402 determines whether the paging channel is scheduled to transmit overhead messages. In a preferred embodiment, a base station timer determines the timing for a minimum number of overhead messages which must be sent. If overhead messages are scheduled, an overhead message is selected 404 from a queue and transmitted 412 on the paging channel.

If no overhead message is scheduled for transmission, a decision step 406 determines whether any mobile directed messages are available for transmission. If so, the base station selects the mobile directed message in a selection step 408 and transmits the message in a process step 412. In other words, mobile directed messages typically preempt overhead messages for other than the minimum required overhead messages.

If no mobile directed message is available, an overhead message is selected from a queue in a selection step 410 and transmitted on the paging channel in process step 412. Once the base station either transmits an available mobile directed message or an overhead message, process control is returned to the first decision step 402 and the procedure is repeated. A base station 400 operating according to this method uses substantially all available time slots on the paging channel for information bearing messages.

Figure 4:
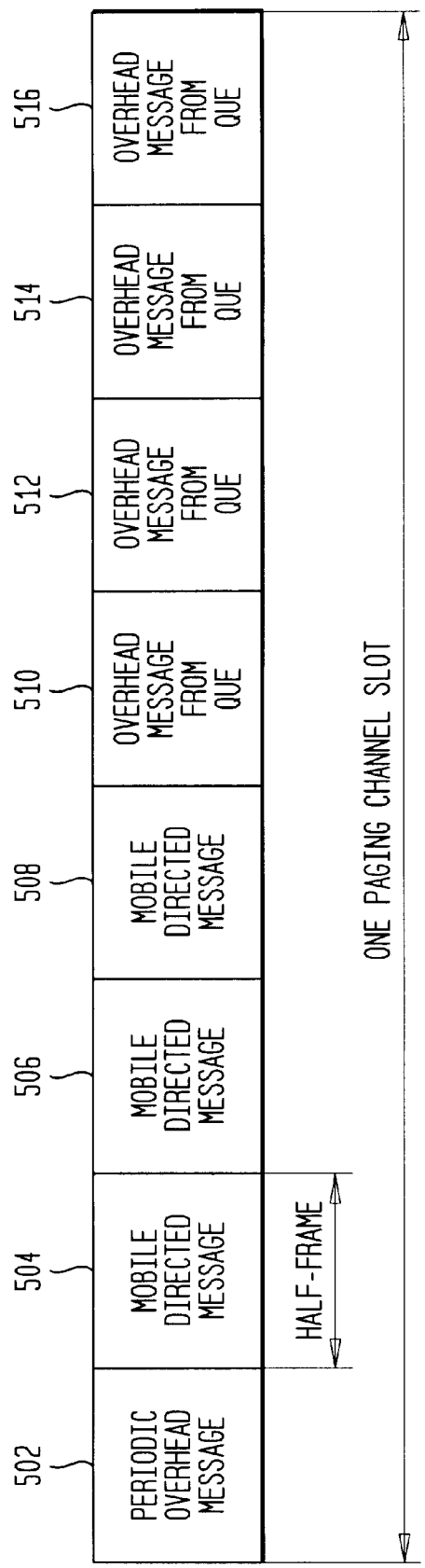
FIG. 4 is an exemplary paging channel slot according to this invention.

In FIG. 4, one exemplary paging channel slot 500 according to this invention is shown. The slot 500 consists of eight half frames 502, 504, 506, 508, 510, 512, 514, 516. A base station operating according to the method of the invention transmits overhead messages according to a predetermined timing convention, as in the first half frame 502 of the paging slot 500. In the next three half frames 504, 506, 508 the paging channel 500 carries mobile directed messages. Absent the method of the invention, however, the next four half frames 510, 512, 514, 516, which precede the next scheduled overhead message, would contain null messages, as no mobile directed messages are available. It is the advantage of this invention that the remaining half frames 510, 512, 514, 516 carry overhead messages instead of null messages. A base station operating according to this invention rarely, if ever, transmits a null message on the paging channel.

Figure 5:
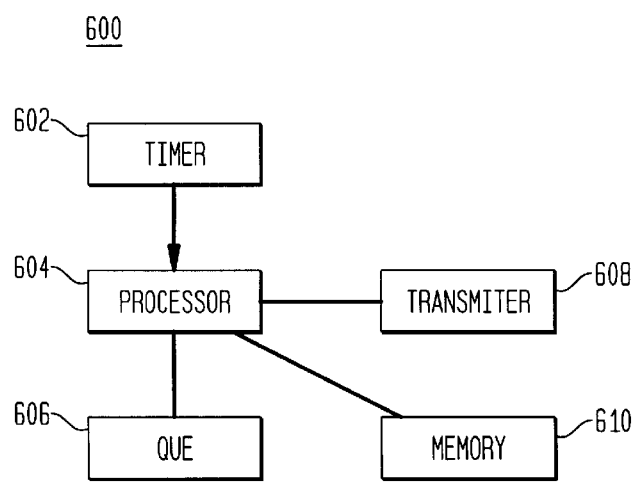
FIG. 5 is an exemplary plurality of paging channel slots according to this invention.

A block diagram 600 of exemplary hardware for implementing the base station functions 400 of FIG. 3 is shown in FIG. 5. A programmable processor 604 controls the base station 400 paging channel function. The processor monitors a timer 602 which signals the processor 604 when the base station 400 must send overhead messages on the paging channel. Upon receipt of such a signal, the overhead message is selected from a queue 606. During intervals when no overhead messages must be sent, the processor 604 determines whether any mobile directed messages are available for transmission, and, if so, it directs the transmitter 608 to send the message. In this exemplary embodiment, the mobile directed messages are stored in a memory 610. If none are available, the processor 604 selects an overhead message from the queue 606 for transmission.

A CDMA system implementing the described invention will exhibit an improved overhead message update rate. The reduced time for a mobile to update overhead messages resulting from this invention will produce improved call origination success rates, without compromising paging channel capacity and without the need to modify existing mobiles.

What is claimed is:

1. A method for arranging overhead message transmission in a wireless communications system, the method comprising the steps of:
   transmitting an overhead message in a time slot according to a predetermined timing convention, wherein time slots other than as determined according to said predetermined timing convention are available for transmission of additional information;
   transmitting a mobile directed message in an available time slot when a mobile directed message is available for transmission; and,
   transmitting an overhead message in said available time slot when no mobile directed message is available for transmission.

2. The method of claim 1 wherein said overhead messages are selected from the group comprising system parameter messages, access parameter messages, neighbor list messages, code division multiple access channel list messages, extended system parameter messages and global service redirection messages.

3. The method of claim 1 wherein said timing convention is periodic.

4. The method of claim 1 wherein said wireless communications system is a code division multiple access system.

5. The method of claim 1 wherein the step of transmitting said mobile directed message further includes the steps of:
   determining whether said timing convention requires transmission of said overhead message; and,
   determining whether a mobile directed message is available for transmission.

6. The method of claim 1 wherein said overhead messages are transmitted on a paging channel.

7. The method of claim 1 wherein said overhead messages are selected according to a predetermined selection criteria.

8. The method of claim 7 wherein said selection criteria selects said overhead messages with substantially equal frequency.

9. In a wireless communications system, a base station comprising:
   a timer operative to establish a plurality of timing intervals;
   first storage means for storing a set of overhead messages;
   second storage means for storing a set of mobile directed messages;
   processor communicative with said timing means, said first storage means and said second storage means, and operative to:

cause said base station to transmit an overhead message elected from said storage means during selected ones of said plurality of timing intervals;

during timing intervals other than said selected ones, cause an available mobile directed message from said generating means to be transmitted by said base station and, when no mobile directed message is available from said generating means, cause additional of said overhead messages stored in said storage means to be transmitted by said base station.

10. The base station of claim 9 wherein said first storage means comprises a queue.

11. The base station of claim 9 wherein said overhead messages are selected from the group comprising system parameter messages, access parameter messages, neighbor list messages, code division multiple access channel list messages, extended system parameter messages and global service redirection messages.

12. The base station of claim 9 wherein said overhead messages are transmitted on a paging channel.

13. The base station of claim 9 wherein said timer signals a substantially periodic passage of time.

14. A method for arranging overhead message transmission in a wireless communications system, the method comprising the steps of:

determining the occurrence of a predetermined time interval;

transmitting one of a plurality of overhead messages during said predetermined time interval;

transmitting a mobile directed message when a mobile directed message is available for transmission during intervals other than said predetermined time interval; and, transmitting other ones of said plurality of overhead messages during said time intervals other than said predetermined time interval, unless said mobile directed message is available for transmission.

15. The method of claim 14 wherein said overhead messages are selected from the group comprising system parameter messages, access parameter messages, neighbor list messages, code division multiple access channel list messages, extended system parameter messages and global service redirection messages.

16. The method of claim 15 wherein said cellular system is a code division multiple access system.

17. The base station subsystem of claim 9 wherein said processor is a programmable processor.

18. A method for arranging overhead message transmission in a wireless communications system, the method comprising the steps of:

selecting an overhead message for transmission; and, transmitting said overhead message in lieu of a null message.

* * * * *